Dec. 29, 1925.

E. HIRSCH 1,567,593

SUPPORT FOR TYPEWRITING MACHINES

Filed April 20, 1925

Patented Dec. 29, 1925.

1,567,593

UNITED STATES PATENT OFFICE.

EUGEN HIRSCH, OF BERLIN, GERMANY.

SUPPORT FOR TYPEWRITING MACHINES.

Application filed April 20, 1925. Serial No. 24,664.

*To all whom it may concern:*

Be it known that I, EUGEN HIRSCH, a citizen of the German Republic, residing at Berlin, Germany, have invented certain new and useful Improvements in Supports for Typewriting Machines, of which the following is a specification.

This invention relates to a support for typewriting machines which is constructed in such a manner that the clattering noise of the typewriting is deadened and the shocks intercepted and absorbed which occur when the platen is pushed from right to left or from left to right.

With this object in view, a wire of sufficient strength is shaped in form of loops, the bends of which are provided with rubber attachments. The two ends of this wire are turned upwards, they hold a steel blade to which a receptacle is fastened, thus forming an elastic support for the typewriter.

Figure 1:
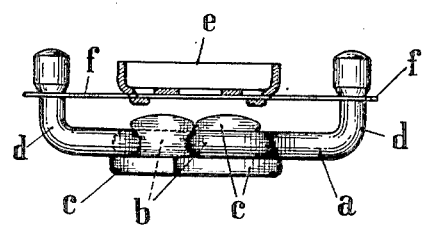

An embodiment of the invention is shown on the accompanying drawing in which:

Fig. 1 is a side elevation, and

Figure 2:
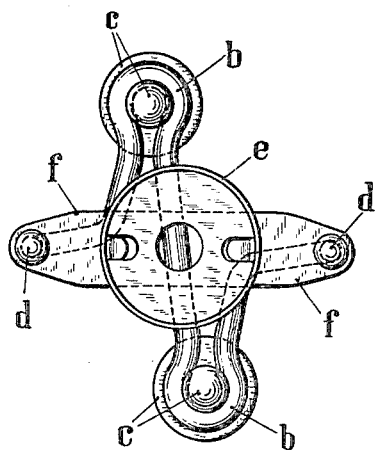

Fig. 2 a plan view.

In the form of construction shown the support is made from strong wire bent in a peculiar manner to form a support $a$ the horizontal arms of which form two loops $b$ designed for the accommodation of rubber feet $c$—preferably springy—which may be of any convenient shape and fixed in any convenient manner.

The holding loops $b$ for the rubber feet $c$ may further be of any other convenient shape. To the arms $d$ bent in upward direction a steel blade $f$ is fastened supporting the receptacle $e$. Four of the supports improved according to the present invention are required for one typewriter. They absorb the shocks of the machine in use and of the movement of the carriage, and they deaden the noise.

I claim:

A support for typewriting machine comprising a wire member having horizontal loops provided with upturned ends, a sound deadening base secured to said loops, a tie member connecting said upturned ends and a receptacle secured on the tie member to form a socket for a typewriter foot.

In testimony whereof I affix my signature.

EUGEN HIRSCH.